United States Patent
Liu et al.

(10) Patent No.: US 12,196,550 B2
(45) Date of Patent: Jan. 14, 2025

(54) OPTICAL MEASUREMENT SYSTEM

(71) Applicant: National Cheng-Kung University, Tainan (TW)

(72) Inventors: Chien-Sheng Liu, Tainan (TW); Wen-Yu Shih, Nantou County (TW)

(73) Assignee: National Cheng-Kung University, Tainan (TW)

( * ) Notice: Subject to any disclaimer, the term of this patent is extended or adjusted under 35 U.S.C. 154(b) by 343 days.

(21) Appl. No.: 17/894,164

(22) Filed: Aug. 24, 2022

(65) Prior Publication Data
US 2024/0035801 A1 Feb. 1, 2024

(30) Foreign Application Priority Data
Jul. 28, 2022 (TW) ................................. 111128336

(51) Int. Cl.
*G01B 9/02015* (2022.01)
*G01B 11/06* (2006.01)
(Continued)

(52) U.S. Cl.
CPC ..... *G01B 9/02028* (2013.01); *G01B 9/02016* (2013.01); *G01B 11/0625* (2013.01); *G01B 11/26* (2013.01); *G01N 21/41* (2013.01)

(58) Field of Classification Search
CPC ..... G01B 11/06; G01B 11/0625; G01B 11/26; G01N 21/41; G01N 2021/4126
See application file for complete search history.

(56) References Cited

U.S. PATENT DOCUMENTS

| | | | |
|---|---|---|---|
| 6,975,410 B1* | 12/2005 | Sturgill | G01B 11/06 356/631 |
| 2003/0090669 A1* | 5/2003 | Jung | G01B 11/0675 356/504 |

(Continued)

FOREIGN PATENT DOCUMENTS

| | | |
|---|---|---|
| CN | 202676139 | 1/2013 |
| CN | 103309169 | 9/2013 |

(Continued)

OTHER PUBLICATIONS

"Office Action of Japan Counterpart Application", issued on Aug. 15, 2023, p. 1-p. 3.

(Continued)

*Primary Examiner* — Michael A Lyons
(74) *Attorney, Agent, or Firm* — JCIPRNET

(57) ABSTRACT

An optical measurement system measuring optical parameters of an object is provided. The object includes at least two light-transmitting layers. The optical measurement system includes a light source module, an image capture module, and a controller. The light source module emits at least two measurement light beams toward the object. The measurement light beams are respectively incident on the object at different angles. The image capture module receives light spots formed on a sensing surface of the image capture module by at least two first light beams after the measurement light beams are reflected by the object and at least two second light beams after the measurement light beams are refracted and reflected between the object. The controller is electrically connected to the image capture module to obtain positions of the light spots. The controller calculates the optical parameters of the object according to the positions of the light spots.

9 Claims, 7 Drawing Sheets

(51) Int. Cl.
*G01B 11/26* (2006.01)
*G01N 21/41* (2006.01)

(56) References Cited

U.S. PATENT DOCUMENTS

| | | | | |
|---|---|---|---|---|
| 2004/0099823 | A1 | 5/2004 | Abraham et al. | |
| 2014/0168637 | A1* | 6/2014 | Wan | G01B 9/02022 356/73 |

FOREIGN PATENT DOCUMENTS

| | | |
|---|---|---|
| CN | 106517086 | 3/2017 |
| CN | 216770672 | 6/2022 |
| JP | 2014517287 | 7/2014 |
| TW | I221901 | 10/2004 |
| TW | 201105923 | 2/2011 |
| TW | 201807404 | 3/2018 |
| WO | 2011007047 | 1/2011 |
| WO | WO-2017204560 A1 * | 11/2017 ......... G01N 21/1717 |

OTHER PUBLICATIONS

"Office Action of Taiwan Counterpart Application", issued on Dec. 23, 2022, p. 1-p. 12.

Chien-Sheng Liu et al., "Thickness and Refractive Index Measurement System for Multilayered Samples", IEEE Access, vol. 9, Feb. 1, 2021, pp. 21474-21480.

Chien-Sheng Liu et al., "Novel system for simultaneously measuring the thickness and refractive index of a transparent plate with two optical paths", Applied Physics B, vol. 124, No. 180, Aug. 23, 2018, pp. 1-11.

Chia-Ming Jan et al., "Optical interference system for simultaneously measuring refractive index and thickness of slim transparent plate", Optics and Lasers in Engineering, vol. 145, No. 106668, Oct. 2021, pp. 1-14.

Chien-Sheng Liu et al., "Optical inspection system for simultaneously measuring thicknesses and refractive indexes of multilayered transparent substrates", Proc. SPIE 12137, Optics and Photonics for Advanced Dimensional Metrology II, 1213700, May 20, 2022, pp. 1-9.

* cited by examiner

OPTICAL MEASUREMENT SYSTEM

CROSS-REFERENCE TO RELATED APPLICATION

This application claims the priority benefit of Taiwan application no. 111128336, filed on Jul. 28, 2022. The entirety of the above-mentioned patent application is hereby incorporated by reference herein and made a part of this specification.

BACKGROUND OF THE INVENTION

Field of the Invention

The invention relates to an optical system, and in particular to an optical measurement system.

Description of Related Art

In recent years, precision miniaturization has become the mainstream trend of industrial development. In response to production line automation and product miniaturization, the development of high-precision testing equipment and high-efficiency measurement techniques has gradually attracted attention.

Measurement techniques may be divided into two categories: contact and non-contact. Contact measurement mostly adopts a probe for measuring. Although the advantage of higher precision is achieved, product characteristics other than dimensions may not be measured and the measurement speed thereof is slower. In addition, the measurement process requires contact with a workpiece, which may damage the surface of the workpiece, thus limiting the variety of products.

Non-contact measurement is non-destructive measurement, that is, the use of optical methods to measure an object to improve measurement speed. Although the representative ellipsometry method and interferometry and confocal methods may achieve high-efficiency measurement of thickness and refractive index, most of them are only adapted for thin plate measurement or individual measurement of single-layer characteristics, and the few methods that may simultaneously measure the thickness and refractive index of multiple layers do not take into account the issue that the material layers are not parallel to each other. However, in the application of biological detection, the liquid sample is entrained between the glass slides, causing the upper and lower glass slides to be non-parallel, or in the quality inspection of glass manufacturing, it is necessary to consider the non-parallel layers of materials.

SUMMARY OF THE INVENTION

The invention provides an optical measurement system that may measure non-parallel material layers between an object to be measured.

An embodiment of the invention provides an optical measurement system adapted to measure optical parameters of an object to be measured. The object to be measured includes at least two light-transmitting layers. The optical measurement system includes a light source module, an image capture module, and a controller. The light source module is configured to emit at least two measurement light beams toward the object to be measured, wherein the measurement light beams are respectively incident on the object to be measured at different angles. The image capture module is configured to receive a plurality of light spots formed on a sensing surface of the image capture module by at least two first light beams after the measurement light beams are reflected by the object to be measured and by at least two second light beams after the measurement light beams are refracted and reflected between the object to be measured. The controller is electrically connected to the image capture module to obtain positions of the light spots. The controller calculates the optical parameters of the object to be measured according to the positions of the light spots.

Based on the above, in an embodiment of the invention, the optical measurement system uses the light source module to emit at least two measurement light beams with different angles toward the object to be measured, and the controller then calculates the optical parameters of the object to be measured according to the positions of the light spots formed by the measurement light beams. Therefore, even if the light-transmitting layers of the object to be measured are not parallel to each other, the optical measurement system of an embodiment of the invention may still measure the optical parameters of the object to be measured.

DESCRIPTION OF THE EMBODIMENTS

Figure 1:
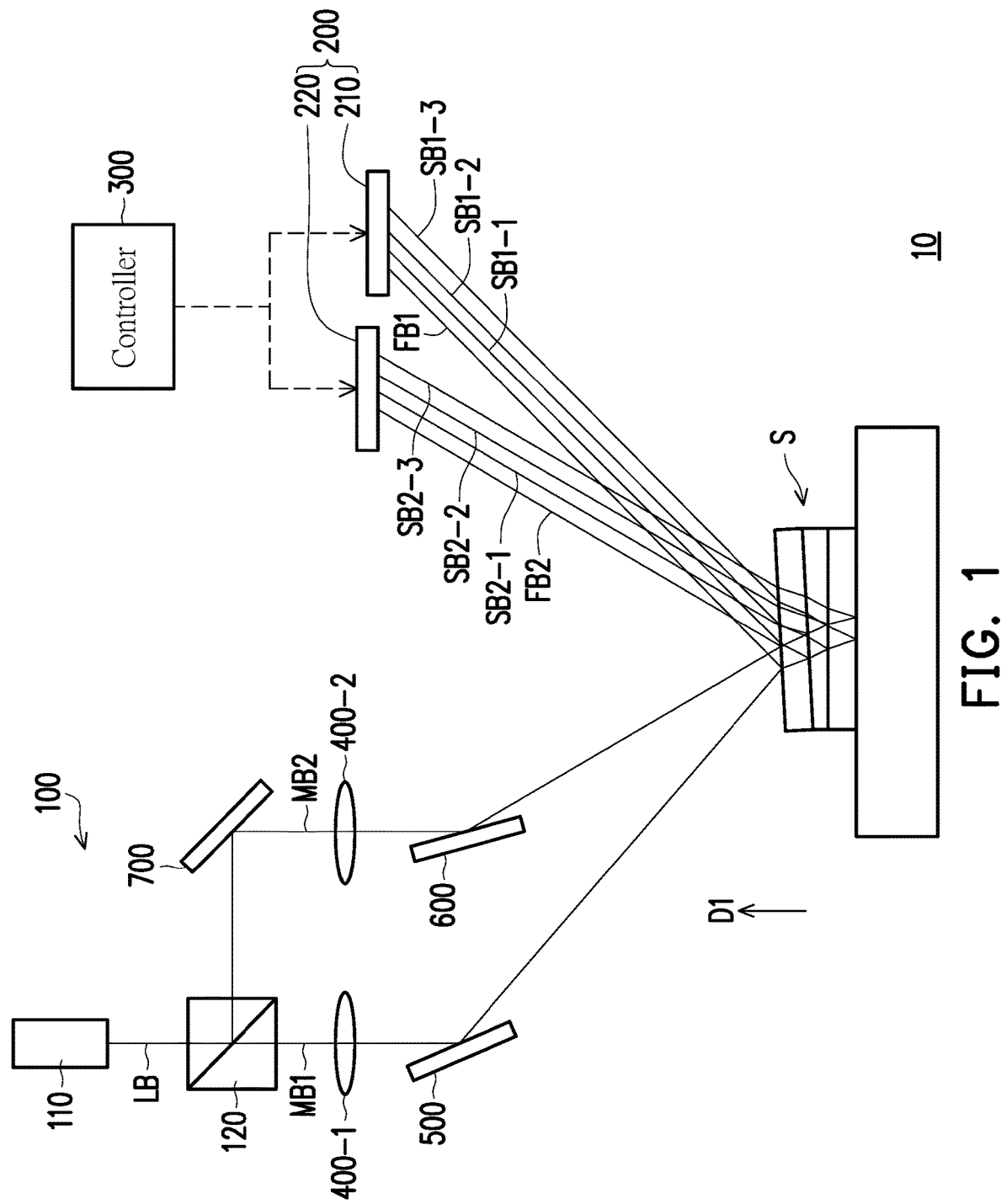
FIG. 1 is a schematic diagram of an optical measurement system according to the first embodiment of the invention.
Figure 2A:
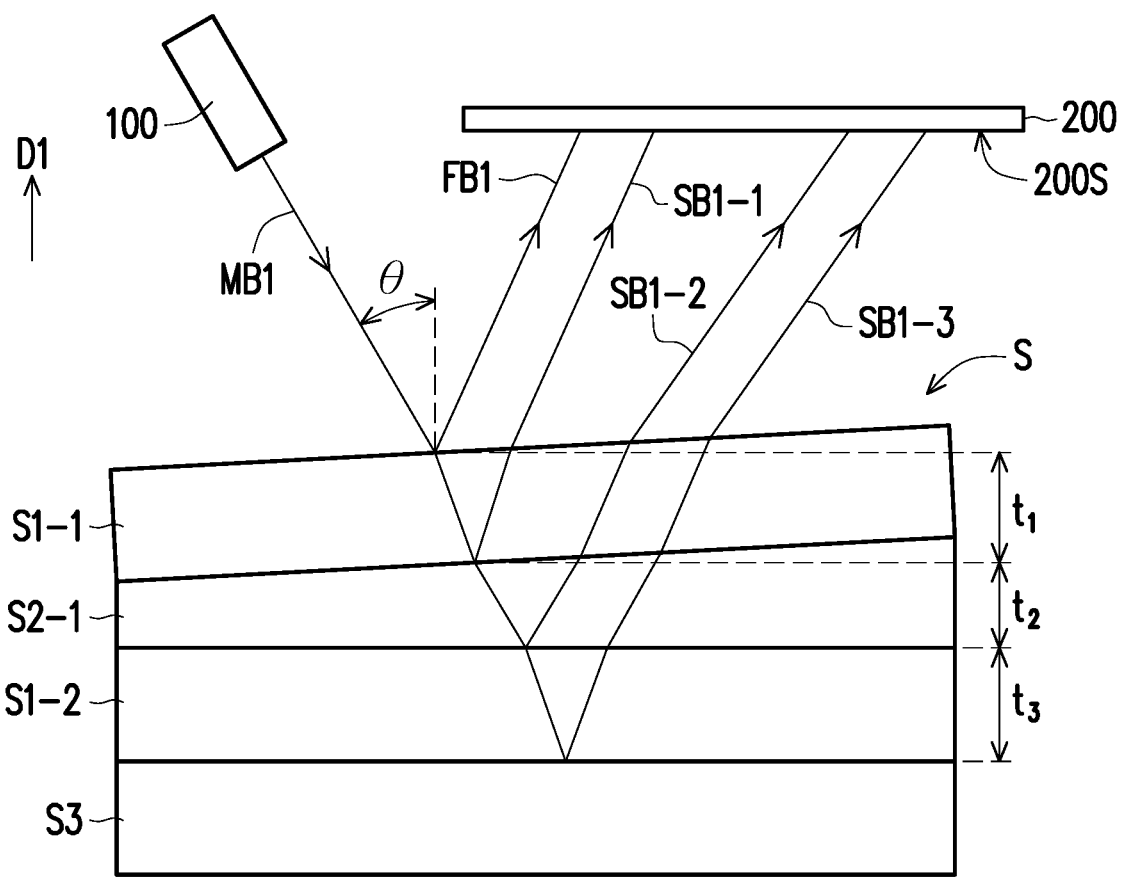
FIG. 2A is an enlarged schematic view of an optical measurement system according to an embodiment of the invention, in which measurement light beams are reflected by an object to be measured and the measurement light beams are refracted and reflected between the object to be measured.

FIG. 1 is a schematic diagram of an optical measurement system according to the first embodiment of the invention. FIG. 2A is an enlarged schematic view of an optical measurement system according to an embodiment of the invention, in which measurement light beams are reflected by an object to be measured and the measurement light beams are refracted and reflected between the object to be measured. Referring to FIG. 1 and FIG. 2A, an embodiment of the invention provides an optical measurement system 10 adapted to measure optical parameters of an object S to be measured. In particular, the object S to be measured is disposed on a reference layer S3, and the object S to be measured is located between the reference layer S3 and a light source module 100. The object S to be measured includes at least two light-transmitting layers. The light-transmitting layers include at least one solid layer S1-1 and S1-2 and at least one liquid layer S2-1. Taking FIG. 2A as an example, the reference layer S3 is, for example, a carrier, the solid layers S1-1 and S1-2 are, for example, a cover glass and a slide glass, respectively, and the liquid layer S2-1 is disposed between the solid layer S1-1 and the solid layer S1-2. FIG. 2A simply illustrates one liquid layer S2-1. When the number of the liquid layers S2-1 is greater than 1, any one of the liquid layers S2-1 is stacked adjacent to two of the solid layers S1-1 and S1-2 and the reference layer S3. That is to say, any two liquid layers S2-1 are not adjacent to each other.

Figure 2B:
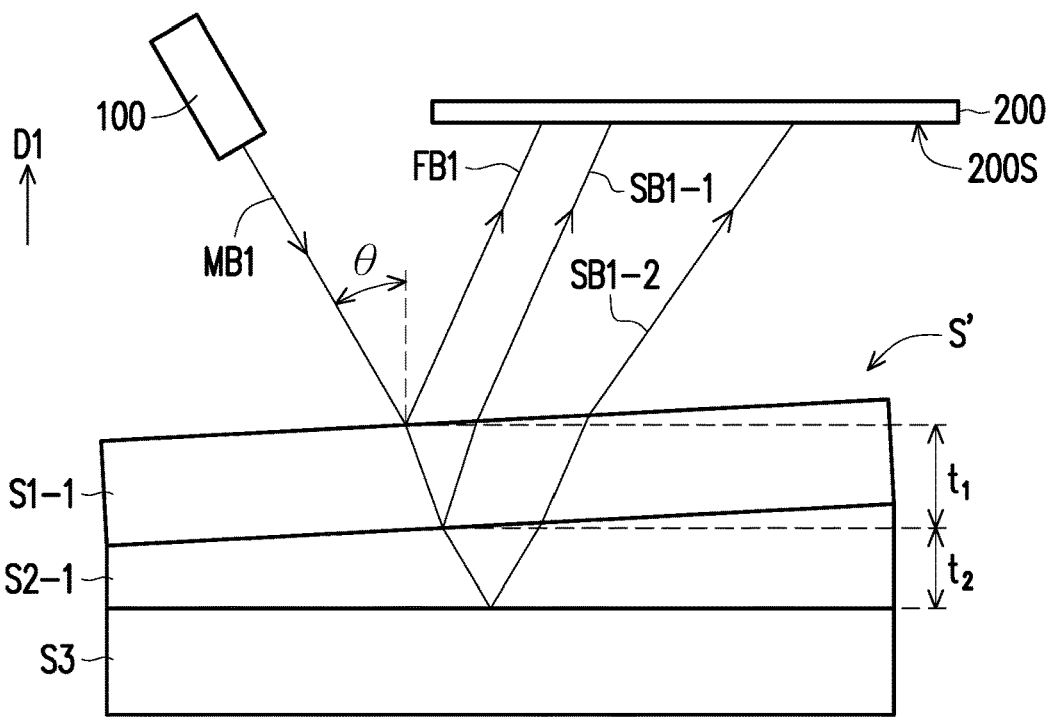
FIG. 2B is an enlarged schematic view of an optical measurement system according to an embodiment of the invention, in which measurement light beams are reflected by another object to be measured and the measurement light beams are refracted and reflected between the object to be measured.

FIG. 2B is an enlarged schematic view of an optical measurement system according to an embodiment of the invention, in which measurement light beams are reflected by another object to be measured and the measurement light beams are refracted and reflected between the object to be measured. Please refer to FIG. 2B. The difference between FIG. 2B and FIG. 2A is that an object S' to be measured in FIG. 2B only includes two light-transmitting layers, and the liquid layer S2-1 is disposed between the solid layer S1-1 and the reference layer S3.

Please refer to FIG. 1 and FIG. 2A again. In the present embodiment, the optical measurement system 10 includes the light source module 100, an image capture module 200, and a controller 300. In particular, a light source 110 in the light source module 100 may include a light-emitting diode (LED) light source, a laser diode (LD) light source, or a combination thereof, or other suitable light sources, and the invention is not limited thereto. The image capture module 200 may be a complementary metal-oxide semiconductor (CMOS) photosensor or a charge-coupled device (CCD) photosensor, but the invention is not limited thereto.

In an embodiment, the controller 300 includes, for example, a microcontroller unit (MCU), a central processing unit (CPU), a microprocessor, a digital signal processor (DSP), a programmable controller, a programmable logic device (PLD), or other similar devices or a combination of the devices, and the invention is not limited thereto. Moreover, in an embodiment, each function of the controller 300 may be implemented as a plurality of program codes. These program codes are stored in one memory, and the program codes are executed by the controller 300. Alternatively, in an embodiment, each function of the controller 300 may be implemented as one or a plurality of circuits. The invention does not limit whether each function of the controller 300 is implemented in a software or hardware form.

Specifically, the light source module 100 of the present embodiment is configured to emit at least two measurement light beams MB1 and MB2 toward the object S to be measured, wherein the measurement light beams MB1 and MB2 are respectively incident on the object S to be measured at different angles θ. The image capture module 200 is configured to receive a plurality of light spots formed on a sensing surface 200S of the image capture module 200 by at least two first light beams FB1 and FB2 after the measurement light beams MB1 and MB2 are reflected by the object S to be measured and by at least two second light beams SB1-1, SB1-2, SB1-3, SB2-1, SB2-2, and SB2-3 after the measurement light beams MB1 and MB2 are refracted and reflected between the object S to be measured. The controller 300 is electrically connected to the image capture module 200 to obtain positions of the light spots. The controller 300 calculates the optical parameters of the object S to be measured according to the positions of the light spots.

Figure 3:
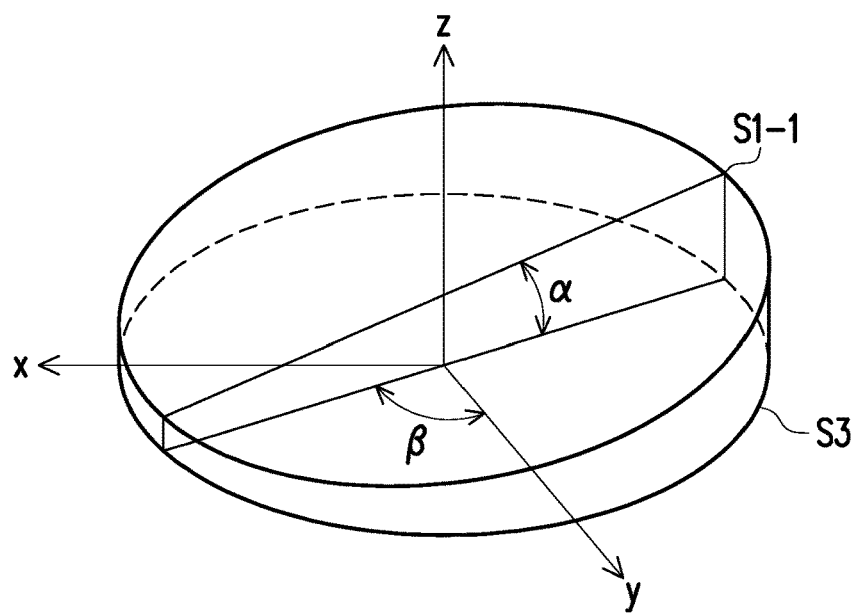
FIG. 3 is an enlarged schematic view of the object to be measured in FIG. 1 relative to the reference layer.

FIG. 3 is an enlarged schematic view of the object to be measured in FIG. 1 relative to the reference layer. In particular, the z-axis direction in FIG. 3 is substantially the same as a stacking direction D1 in FIG. 2A. However, the x and y axes in FIG. 3 fall on the boundary surface of the reference layer S3, and are not repeated herein.

Referring to FIG. 2A and FIG. 3, in the present embodiment, the optical parameters include the refractive index of each of the light-transmitting layers, thicknesses t1, t2, and t3 of each of the light-transmitting layers, and inclination angles α and β of the two boundary surfaces of each of the solid layers S1-1 and S1-2 with respect to the surface of the reference layer S3 perpendicular to the stacking direction D1, wherein the stacking direction D1 is the direction from the reference layer S3 to the object S to be measured, the thicknesses t1, t2, and t3 are the shortest distances between the two boundary surfaces of each of the light-transmitting layers along the stacking direction D1, the inclination angle α is the angle of rotation about the x-axis or the y-axis, and the inclination angle β is the angle of rotation about the z-axis.

In the present embodiment, the optical measurement system satisfies the following conditional formula: $n*(m+1) \geq p$, wherein n is the number of measurement light beams MB1 and MB2, m is the number of light-transmitting layers, and p is the number of optical parameters.

Taking FIG. 2A as an example, when the measurement light beam MB1 is incident on the object S to be measured, a phenomenon of partial reflection and partial transmission occurs on the surface of each of the light-transmitting layers, and the partially transmitted light travels to the next surface opposite to a stacking direction D2 in a manner that satisfies Snell's law. In particular, the first light beam FB1 is generated in the light-transmitting layer (the solid layer S1-1 in FIG. 2A) closest to the light source module 100 in the object S to be measured, and the partially transmitted light generates the second light beams SB1-1, SB1-2, and SB1-3 in sequence. Although the light refracted then reflected is still partially transmitted and partially reflected on the surface of the light-transmitting layer during the process of being transmitted to the image capture module 200, the light intensity of the partially reflected light thereof (that is, at least two reflections) is relatively weak. Therefore, it is only necessary to consider the light spots formed on the sensing surface 200S by the first light beam FB1 and the second light beams SB1-1, SB1-2, and SB1-3. To put it simply, in the case where the object S to be measured of FIG. 2A only includes three light-transmitting layers, the measurement light beam MB1 forms four light spots on the sensing surface 200S. Similarly, when the object S to be measured includes m light-transmitting layers, the measurement light beam MB1 forms m+1 light spots on the sensing surface 200S. Therefore, the two measurement light beams MB1 and MB2 form 2(m+1) light spots on the sensing surface 200S.

Moreover, the positions of the light spots formed by each of the light beams FB1, FB2, SB1-1, SB1-2, SB1-3, SB2-1, SB2-2, and SB2-3 on the sensing surface 200S are related to the light trajectories of the light beams FB1, FB2, SB1-1, SB1-2, SB1-3, SB2-1, SB2-2, and SB2-3 thereof. The light trajectories are related to the optical parameters of the object S to be measured (refractive index of the light-transmitting layer, thicknesses t1, t2, and t3, and the inclination angles α and β of each of the solid layers S1-1 and S1-2). Therefore, the optical parameters of the object S to be measured may be calculated by using the (4×4) homogeneous coordinate transformation and skew ray tracing method.

In the present embodiment, the light source module 100 includes the light source 110, at least one beam splitter 120, and at least two lenses 400-1 and 400-2. The light source 110 is configured to emit a light beam LB. The beam splitter 120 is disposed on the optical path of the light beam LB and configured to divide the light beam LB into the at least two measurement light beams MB1 and MB2. The lenses 400-1 and 400-2 are respectively disposed on the optical path of the measurement light beams MB1 and MB2 and configured to focus the first light beams FB1 and FB2 and the second light beams SB1-1, SB1-2, SB1-3, SB2-1, SB2-2, and SB2-3 on the sensing surface 200S of the image capture module 200.

In the present embodiment, the optical measurement system further includes reflectors 500, 600, and 700. The reflectors 500, 600, and 700 are all disposed between the beam splitter 120 and the object S to be measured on the optical path of the measurement light beams MB1 and MB2. In particular, the reflectors 500 is disposed between the beam splitter 120 and the object S to be measured on the optical path of the measurement light beam MB1. The reflectors 600 and 700 are disposed between the beam splitter 120 and the object S to be measured on the optical path of the measurement light beam MB2.

In the present embodiment, the image capture module 200 may include a plurality of sub-image capture modules 210 and 220. That is to say, the sub-image capture modules 210 and 220 with a smaller sensing area may be used to replace the image capture module with a large sensing area, so the cost may be lower.

Based on the above, in an embodiment of the invention, the optical measurement system 10 uses the light source module 100 to emit the at least two measurement light beams MB1 and MB2 toward the object S to be measured, and the measurement light beams MB1 and MB2 are respectively incident on the object S to be measured at different angles θ. The measurement light beams MB1 and MB2 are reflected and refracted by the object S to be measured, and the reflected light beams FB1, FB2, SB1-1, SB1-2, SB1-3, SB2-1, SB2-2, and SB2-3 form a plurality of light spots on the sensing surface 200S of the image capture module 200. The controller 300 calculates the optical parameters of the object S to be measured according to the positions of the light spots. Therefore, even if the light-transmitting layers of the object S to be measured are not parallel to each other, the optical measurement system 10 of an embodiment of the invention may still measure the optical parameters of the object S to be measured.

Moreover, in an embodiment of the invention, since the optical measurement system 10 is provided with the lenses 400-1 and 400-2 on the optical path of the measurement light beams MB1 and MB2, the first light beams FB1 and FB2 and the second light beams SB1-1, SB1-2, SB1-3, SB2-1, SB2-2, and SB2-3 may be focused on the sensing surface 200S of the image capture module 200. Therefore, the issue that the light spots formed by the light beams FB1, FB2, SB1-1, SB1-2, SB1-3, SB2-1, SB2-2, and SB2-3 on the sensing surface 200S are too large such that the positions of the light spots cannot be distinguished is avoided. Thus, measurement reliability is improved.

Figure 4:
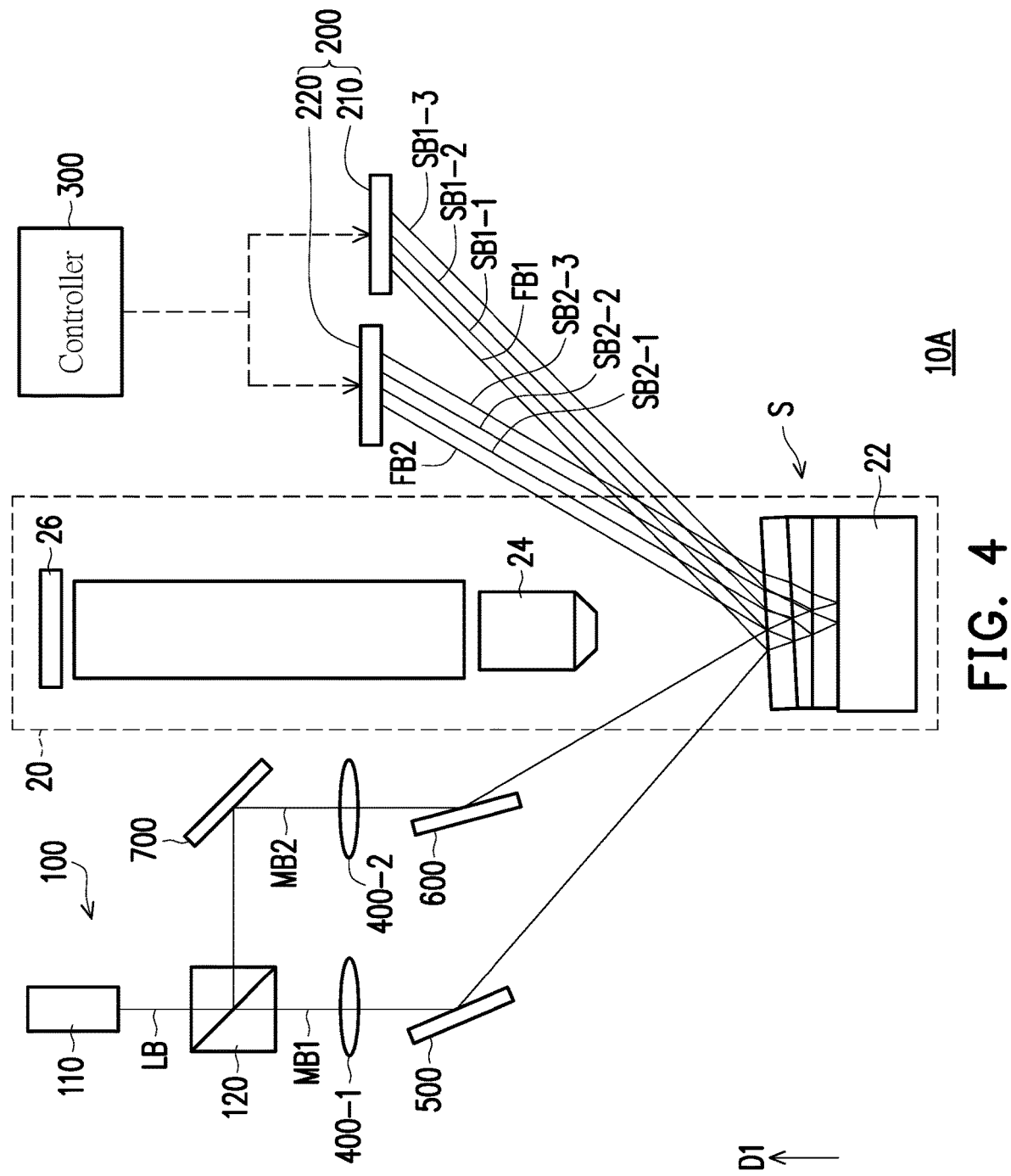
FIG. 4 is a schematic diagram of an optical measurement system according to the second embodiment of the invention.

FIG. 4 is a schematic diagram of an optical measurement system according to the second embodiment of the invention. Please refer to FIG. 4, an optical measurement system 10A of the present embodiment is similar to the optical measurement system 10 of FIG. 1, and the main differences thereof are as follows. In the present embodiment, the optical measurement system 10A further includes an autofocus imaging module 20. The autofocus imaging module 20 is configured to capture an image of the object S to be measured according to the optical parameters. In particular, the autofocus imaging module 20 may include a mover 22, an objective lens 24, and an image sensor 26. The mover 22 is configured to carry the reference layer S3 and the object S to be measured, and is adapted to change the distance between the object S to be measured and the objective lens 24. The objective lens 24 is disposed between the object S to be measured and the image sensor 26. The image sensor 26 is configured to image the object S to be measured. The other advantages of the optical measurement system 10A are similar to those of the optical measurement system 10 in FIG. 1, and are not repeated herein.

Figure 5:
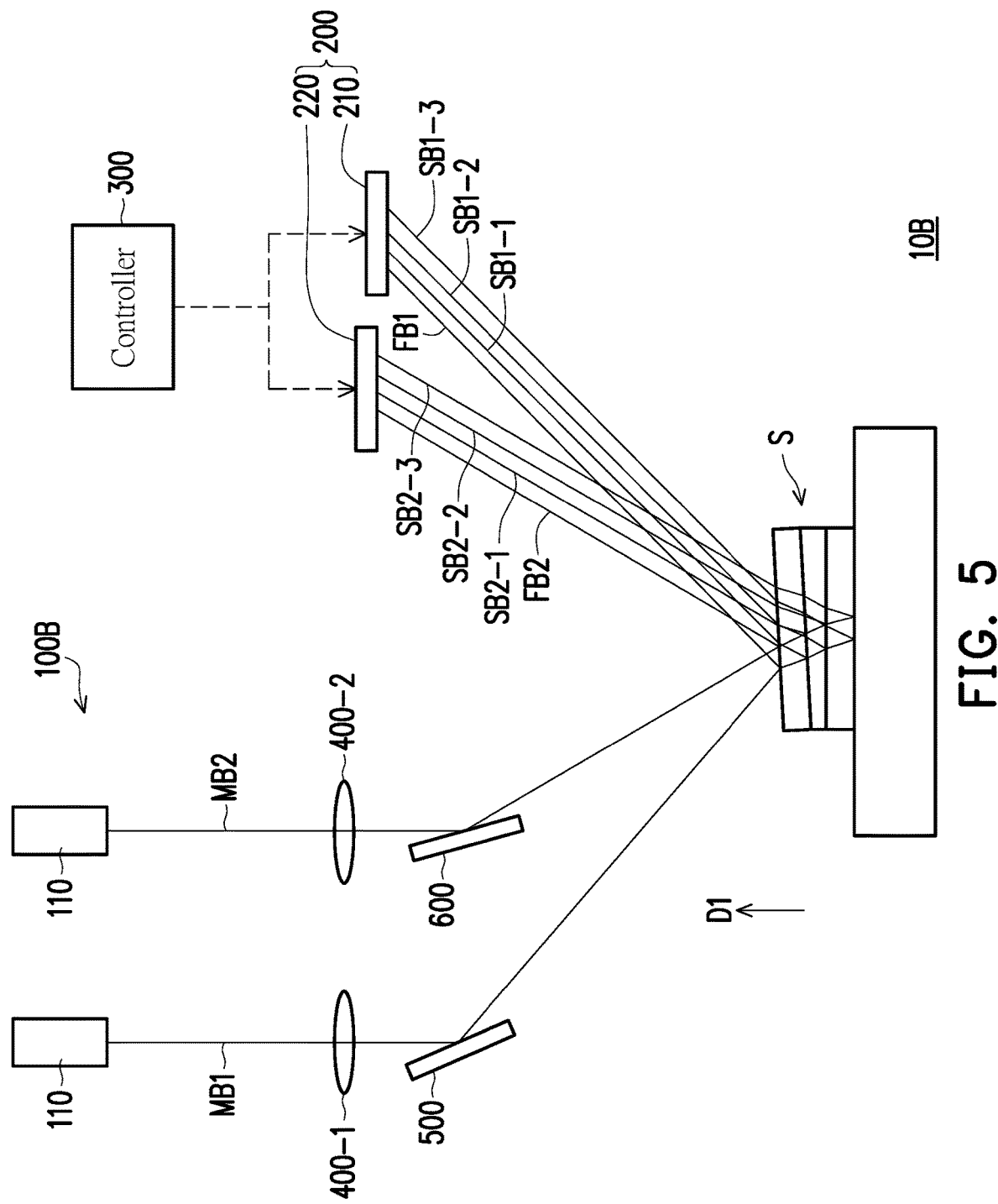
FIG. 5 is a schematic diagram of an optical measurement system according to the third embodiment of the invention.

FIG. 5 is a schematic diagram of an optical measurement system according to the third embodiment of the invention. Please refer to FIG. 5, an optical measurement system 10B of the present embodiment is similar to the optical measurement system 10 of FIG. 1, and the main differences thereof are as follows. In the present embodiment, a light source module 110B includes at least two light sources 110 respectively configured to emit the at least two measurement light beams MB1 and MB2. The optical measurement system 10B further includes the at least two lenses 400-1 and 400-2 and the at least two reflectors 500 and 600. The lenses 400-1 and 400-2 are respectively disposed on the optical path of the measurement light beams MB1 and MB2 and configured to focus the first light beams FB1 and FB2 and the second light beams SB1-1, SB1-2, SB1-3, SB2-1, SB2-2, and SB2-3 on the sensing surface 200S of the image capture module 200. The reflectors 500 and 600 are respectively disposed between the lenses 400-1 and 400-2 and the object S to be measured on the optical path of the measurement light beams MB1 and MB2. The reflection surfaces of the reflectors 500 and 600 have different angles, so that the measurement light beams MB1 and MB2 are respectively incident on the object S to be measured at different angles θ. The other advantages of the optical measurement system 10B are similar to those of the optical measurement system 10 in FIG. 1, and are not repeated herein.

Figure 6:
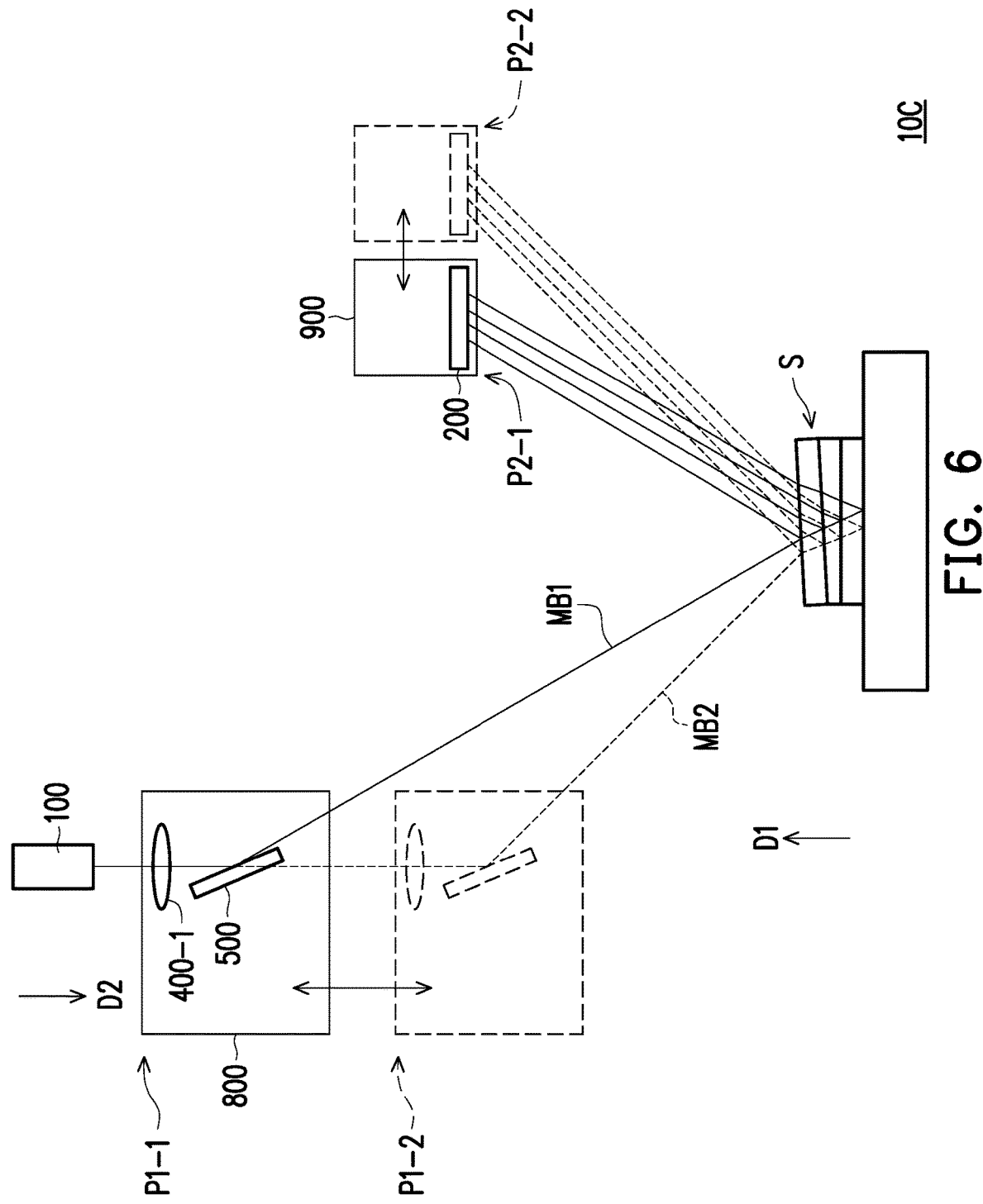
FIG. 6 is a schematic diagram of an optical measurement system according to the fourth embodiment of the invention.

FIG. 6 is a schematic diagram of an optical measurement system according to the fourth embodiment of the invention. Please refer to FIG. 6, an optical measurement system 10C of the present embodiment is similar to the optical measurement system 10 of FIG. 1, and the main differences thereof are as follows. In the present embodiment, the optical measurement system 10C further includes the lens 400-1, the reflector 500, and a rotating and moving carrier 800. The lens 400-1 is disposed on the optical path of the measurement light beams MB1 and MB2 and configured to focus the first light beams FB1 and FB2 and the second light beams SB1-1, SB1-2, SB1-3, SB2-1, SB2-2, and SB2-3 on the sensing surface 200S of the image capture module 200. The reflector 500 is disposed between the lens 400-1 and the object S to be measured on the optical path of the measurement light beams MB1 and MB2. The rotating and moving carrier 800 is configured to carry the lens 400-1 and the reflector 500 and adapted to move along the emitting direction D2 of the measurement light beams MB1 and MB2 after exiting from the light source module 100, and is adapted to rotate the reflector 500, so that the lens 400-1 and the reflector 500 are located at at least two first displacement points P1-1 and P1-2 at different times, and the reflecting surface of the reflector 500 has different angles at different first displacement points P1-1 and P1-2, so that the measurement light beams MB1 and MB2 are respectively incident on the object S to be measured at different times.

In the present embodiment, the optical measurement system 10C further includes a moving carrier 900. The moving carrier 900 is configured to carry the image capture module 200 and adapted to move along the direction perpendicular to the emitting direction D2, so that the image capture module 200 is located at at least two second displacement points P2-1 and P2-2 at different times, so that the image capture module 200 receives the first light beams FB1 and FB2 respectively at different times, and the image capture module 200 receives the second light beams SB1-1, SB1-2, SB1-3, SB2-1, SB2-2, and SB2-3 at different times respectively. The other advantages of the optical measurement system 10C are similar to those of the optical measurement system 10 in FIG. 1, and are not repeated herein.

Figure 7:
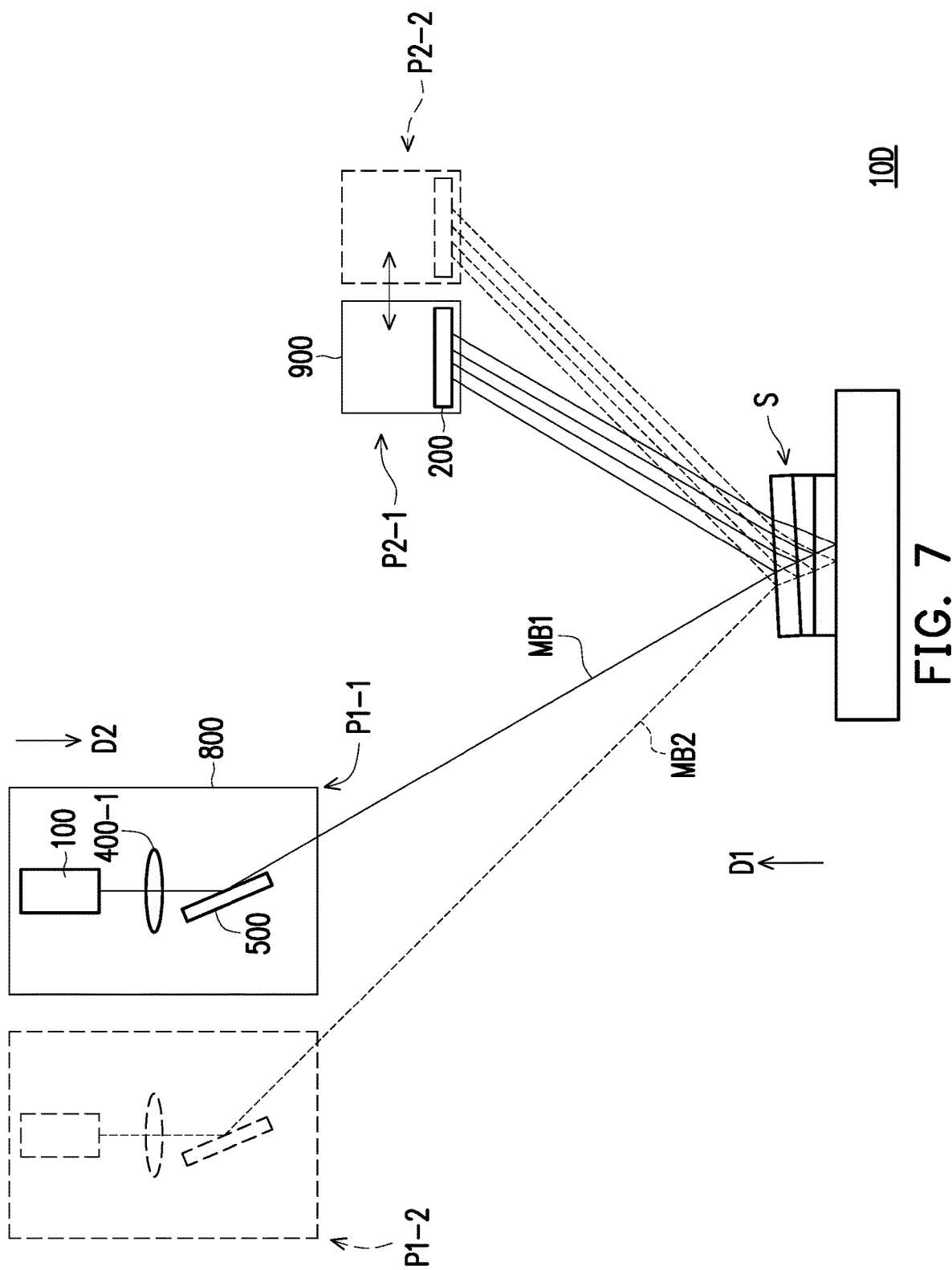
FIG. 7 is a schematic diagram of an optical measurement system according to the fifth embodiment of the invention.

FIG. 7 is a schematic diagram of an optical measurement system according to the fifth embodiment of the invention. Please refer to FIG. 7, an optical measurement system 10D of the present embodiment is similar to the optical measurement system 10C of FIG. 6, and the main differences thereof are as follows. In the present embodiment, the rotating and moving carrier 800 is configured to carry the light source module 100, the lens 400-1, and the reflector 500, and is adapted to move along the emitting direction D2 perpendicular to the measurement light beams MB1 and MB2 after exiting from the light source module 100, and is adapted to rotate the reflector 500, so that the light source module 100, the lens 400-1, and the reflector 500 are located at the at least two first displacement points P1-1 and P1-2 at different times, and the reflecting surface of the reflector 500 has different angles at the different first displacement points P1-1 and P1-2, so that the measurement light beams MB1 and MB2 are respectively incident on the object S to be measured at different times. The other advantages of the optical measurement system 10D are similar to those of the optical measurement system 10C in FIG. 6, and are not repeated herein.

Based on the above, in an embodiment of the invention, the optical measurement system uses the light source module to emit at least two measurement light beams toward the object to be measured, and the measurement light beams are respectively incident on the object to be measured at different angles. The controller calculates the optical parameters of the object to be measured according to the positions of the light spots. Therefore, even if the light-transmitting layers of the object to be measured are not parallel to each other, the optical measurement system of an embodiment of the invention may still measure the optical parameters of the object to be measured.

What is claimed is:

1. An optical measurement system, adapted to measure optical parameters of an object to be measured, the object to be measured comprises at least two light-transmitting layers, and the optical measurement system comprises:
   a light source module configured to emit at least two measurement light beams toward the object to be measured, wherein the at least two measurement light beams are respectively incident on the object to be measured at different angles;
   a photosensor configured to receive a plurality of light spots formed on a sensing surface of the photosensor by at least two first light beams after the at least two measurement light beams are reflected by the object to be measured and by at least two second light beams after the at least two measurement light beams are refracted and reflected between the object to be measured; and
   a controller electrically connected to the photosensor to obtain positions of the light spots; and
   a lens disposed on an optical path of the at least two measurement light beams and configured to focus the at least two first light beams and the at least two second light beams on the sensing surface of the photosensor;
   a reflector disposed between the lens and the object to be measured on the optical path of the at least two measurement light beams; and
   a rotating and moving carrier configured to carry the lens and the reflector, adapted to move along an emitting direction of the at least two measurement light beams after exiting from the light source module, or to move along a direction perpendicular to the emitting direction of the at least two measurement light beams after exiting from the light source module, and adapted to rotate the reflector so that the lens and the reflector are located at at least two first displacement points at different times, and a reflecting surface of the reflector has different angles at the different first displacement points, so that the at least two measurement light beams are respectively incident on the object to be measured at different times,
   wherein the controller calculates the optical parameters of the object to be measured according to the positions of the light spots.

2. The optical measurement system of claim 1, wherein the object to be measured is disposed on a reference layer, and the object to be measured is located between the reference layer and the light source module, the at least two light-transmitting layers comprise at least one solid layer and at least one liquid layer, and any liquid layer is stacked adjacent to two of the at least one solid layer and the reference layer,
   wherein the optical parameters comprise a refractive index of each of the light-transmitting layers, a thickness of each of the light-transmitting layers, and an inclination angle of two boundary surfaces of each of the solid layers relative to a surface of the reference layer in a direction perpendicular to a stacking direction, wherein the stacking direction is a direction of the reference layer toward the object to be measured, and the thickness is a shortest distance along the stacking direction of the two boundary surfaces of each of the light-transmitting layers.

3. The optical measurement system of claim 2, wherein the optical measurement system satisfies the following conditional formula: $n*(m+1) \geq p$, wherein n is a number of the at least two measurement light beams, m is a number of the at least two light-transmitting layers, and p is a number of the optical parameters.

4. The optical measurement system of claim 1, wherein the light source module comprises:
   a light source configured to emit a light beam;
   at least one beam splitter disposed on an optical path of the light beam and configured to divide the light beam into the at least two measurement light beams; and
   at least two lenses respectively disposed on an optical path of the at least two measurement light beams and configured to focus the at least two first light beams and the at least two second light beams on the sensing surface of the photosensor.

5. The optical measurement system of claim 1, wherein the photosensor comprises a plurality of sub-photosensors.

6. The optical measurement system of claim 1, further comprising:
an autofocus imaging module configured to capture an image of the object to be measured according to the optical parameters.

7. The optical measurement system of claim 1, wherein the light source module comprises at least two light sources respectively configured to emit the at least two measurement light beams, and the optical measurement system further comprises:
at least two lenses respectively disposed on an optical path of the at least two measurement light beams and configured to focus the at least two first light beams and the at least two second light beams on the sensing surface of the photosensor; and
at least two reflectors respectively disposed between the at least two lenses and the object to be measured on the optical path of the at least two measurement light beams,
wherein reflecting surfaces of the at least two reflectors have different angles, so that the at least two measurement light beams are respectively incident on the object to be measured at different angles.

8. The optical measurement system of claim 1, further comprising:
a moving carrier configured to carry the photosensor and adapted to move perpendicular to the emitting direction, so that the photosensor is located at at least two second displacement points at different times, so that the photosensor receives the at least two first light beams at different times, and the photosensor receives the at least two second light beams at different times.

9. The optical measurement system of claim 1, further comprising:
a moving carrier configured to carry the photosensor and adapted to move perpendicular to the emitting direction, so that the photosensor is located at at least two second displacement points at different times, so that the photosensor receives the at least two first light beams at different times, and the photosensor receives the at least two second light beams at different times.

\* \* \* \* \*